US012492481B2

(12) United States Patent
Hirschorn et al.

(10) Patent No.: US 12,492,481 B2
(45) Date of Patent: Dec. 9, 2025

(54) ELECTROLYZER FOR SPONTANEOUSLY GENERATING HYDROGEN AND A METHOD FOR IMPLEMENTING SAME

(71) Applicant: BST Systems, Inc., Plainfield, CT (US)

(72) Inventors: Bryan D Hirschorn, Pawcatuck, CT (US); Michael A Solis, Colchester, CT (US)

(73) Assignee: BST Systems, Inc., Plainfield, CT (US)

( * ) Notice: Subject to any disclaimer, the term of this patent is extended or adjusted under 35 U.S.C. 154(b) by 654 days.

(21) Appl. No.: 17/876,831

(22) Filed: Jul. 29, 2022

(65) Prior Publication Data

US 2023/0126106 A1    Apr. 27, 2023

Related U.S. Application Data

(60) Provisional application No. 63/270,251, filed on Oct. 21, 2021.

(51) Int. Cl.
*C25B 1/04*     (2021.01)
*C25B 5/00*     (2006.01)
(Continued)

(52) U.S. Cl.
CPC .................. *C25B 1/04* (2013.01); *C25B 5/00* (2013.01); *C25B 9/60* (2021.01); *C25B 11/061* (2021.01);
(Continued)

(58) Field of Classification Search
CPC ..................................... C25B 1/02; C25B 1/04
See application file for complete search history.

(56) References Cited

U.S. PATENT DOCUMENTS 7,393,440 B2   7/2008  Ghosh et al.
8,617,766 B2  12/2013  Bienvenu
(Continued)

FOREIGN PATENT DOCUMENTS

FR        3125069        1/2023
WO    WO-2009127145 A1 * 10/2009  ............... C25B 1/04
WO        2017115269     7/2017

OTHER PUBLICATIONS

Machine translation of WO2009/127145A1 of Huang (Year: 2009).*
(Continued)

*Primary Examiner* — Brian W Cohen
(74) *Attorney, Agent, or Firm* — Womble Bond Dickinson (US) LLP

(57) ABSTRACT

An Electrolyzer Cell (EC) configured to store electrical energy on charge and generate spontaneous hydrogen on discharge is provided, wherein the Electrolyzer Cell may include a cell casing having a casing bottom and defining a cell cavity. The Electrolyzer Cell may also include a plurality of positive electrodes, wherein the plurality of positive electrodes are electrically connected together and a plurality of negative electrodes, wherein the plurality of negative electrodes are electrically connected together. The Electrolyzer Cell may further include an aqueous electrolyte containing a reversible, electro-active material, wherein the aqueous electrolyte, the plurality of positive electrodes and the plurality of negative electrodes are located within the cell cavity, and wherein each of the plurality of positive electrodes are configured to be spaced apart from each of the plurality of negative electrodes.

36 Claims, 10 Drawing Sheets

(51) Int. Cl.
  *C25B 9/60*    (2021.01)
  *C25B 11/061*  (2021.01)
  *C25B 15/02*   (2021.01)
  *C25B 15/08*   (2006.01)
  *H01M 10/44*   (2006.01)
(52) U.S. Cl.
  CPC ............ *C25B 15/02* (2013.01); *C25B 15/083* (2021.01); *H01M 10/44* (2013.01)

(56) References Cited

U.S. PATENT DOCUMENTS

| | | |
|---|---|---|
| 10,297,888 B2* | 5/2019 | Zhang ................ H01M 8/0444 |
| 2009/0078568 A1 | 3/2009 | Ramaswami et al. |
| 2011/0114496 A1 | 5/2011 | Dopp et al. |
| 2021/0313606 A1 | 10/2021 | Mills |
| 2022/0074059 A1* | 3/2022 | Weninger ................ H01M 4/38 |

OTHER PUBLICATIONS

Horri et al "A highly efficient hydrogen generation electrolysis system using alkaline zinc hydroxide solution" International Journal of Hydrogen Energy, 2019, 72-81. (Year: 2018).*

Heske et al; "High Efficiency Generation of Hydrogen Fuels Using Solar Thermochemical Splitting of Water"; Funded by U.S. Department of Energy, Solar Technologies Program; Sep. 29, 2011; 400 pages; www.osti.gov/servlets/purl/1025597.

* cited by examiner

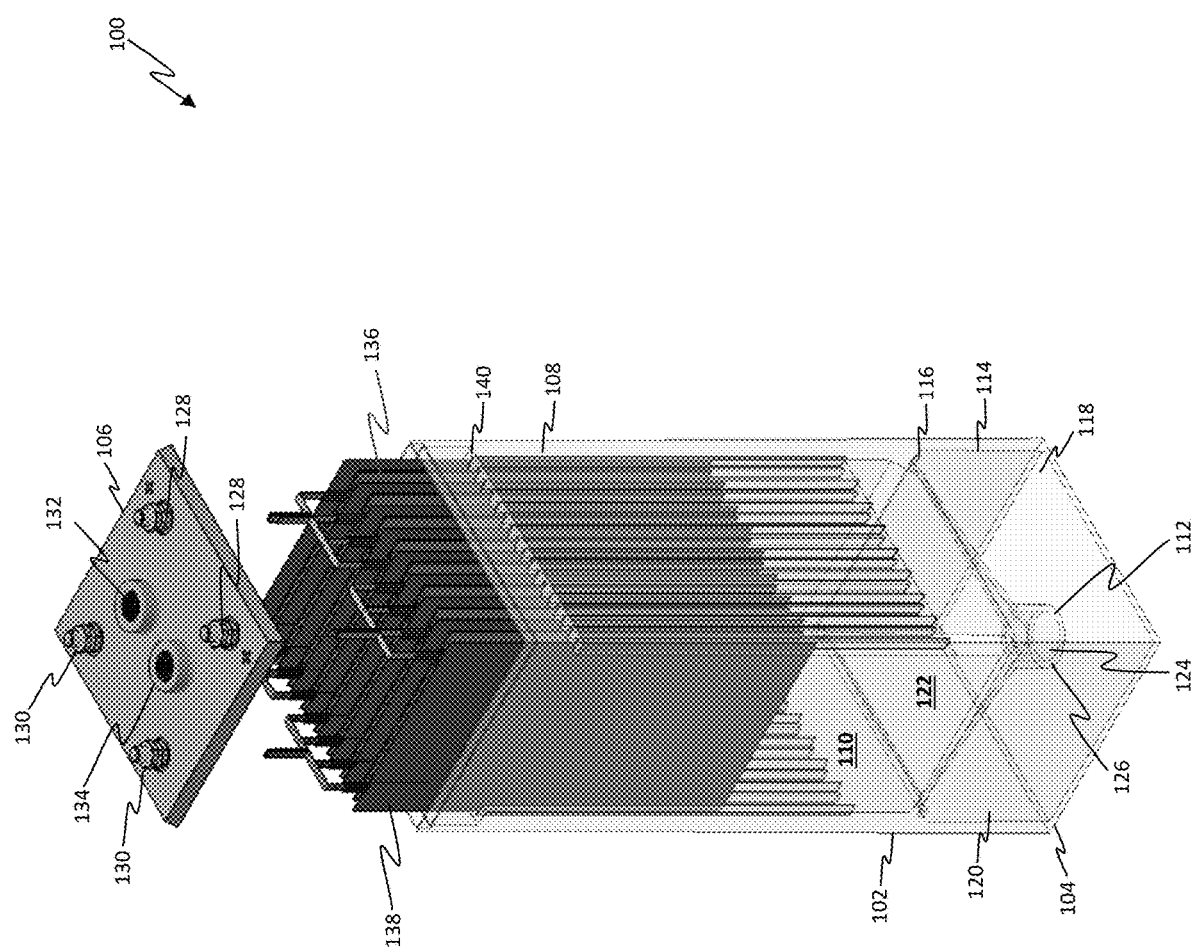

ELECTROLYZER FOR SPONTANEOUSLY GENERATING HYDROGEN AND A METHOD FOR IMPLEMENTING SAME

CROSS-REFERENCE TO RELATED APPLICATIONS

This application is related to and claims the benefit of priority of the filing date of U.S. Provisional Patent Application Ser. No. 63/270,251, filed on Oct. 21, 2021, the contents of which are incorporated by reference herein in its entirety.

FIELD OF THE INVENTION

The present invention relates generally to a device for producing hydrogen gas, and more particularly to a device for spontaneously electrolyzing water to produce hydrogen gas.

BACKGROUND OF THE INVENTION

Hydrogen is a clean and potentially renewable fuel source having a specific energy density which is approximately equal to 33.3 kWh of usable energy per kilogram (kg) (33.3 kwh/kg H2 theoretical lower heating value). Unfortunately, however, the implementation of Hydrogen as a renewable energy source is limited by both technical and economic challenges associated with its generation, compression, storage and delivery. The two most common methods for generating hydrogen are "steam-methane reforming" and "electrolysis" which differ based on the source from which the hydrogen is being generated. The steam-methane reforming method is a method for producing hydrogen from natural gas which is mostly methane. This method typically emits Carbon Dioxide ($CO_2$) into the atmosphere, which is undesirable, and therefore, is typically referred to as "grey hydrogen." The electrolysis method produces hydrogen without the use of fossil fuels and involves the process of 'water splitting.' In the electrolysis method electricity is used to split the water molecules into hydrogen and oxygen gas. Hydrogen generated in this manner (i.e., generated from a renewable and carbon-free energy source such as solar, wind, nuclear and hydro) is typically referred to as "green hydrogen."

Currently, the electrolysis method may be accomplished by conventional, "state-of-the-art" electrolyzers, such as Polymer Electrolyte Membrane (PEM) Electrolyzers, Anion Exchange Membrane (AEM) Electrolyzers, Alkaline Electrolyzers (AE), and Solid Oxide (SO) Electrolyzers, which split water in a single step. Accordingly, input energy is required during the hydrogen generation phase to cause the water molecules to split. If the generated hydrogen is to be used at a later time, such as for fuel for heat or power, then compression and storage of the hydrogen will be required. Unfortunately, however, mechanical and/or electrochemical compression of the hydrogen is expensive, having a Capital Expense (CapEx) which is typically in the range of $20,000 to $60,000 kg $H_2$/hour depending upon the type, scale and desired output pressure. Moreover, storage of the hydrogen is also expensive, having a Capital Expense (CapEx) which is typically in the range of $1,000 to $3,000 per kg $H_2$. Furthermore, conventional electrolyzers, such as PEMs, AEMs, AEs and SOs typically require precious platinum group metal catalysts, organic based membranes that are prone to degradation (for example, such as Nafion), and a complicated, material and labor intensive bi-polar design, all of which are very expensive, having a typical CapEx of approximately $40,000-$80,000 kg $H_2$/hour. All of this is undesirable because it increases cost for producing and operating systems that use hydrogen as a renewable fuel source.

SUMMARY OF THE INVENTION

An Electrolyzer Cell (EC) configured to store electrical energy on charge and generate spontaneous hydrogen on discharge is provided, wherein the Electrolyzer Cell may include a cell casing having a casing bottom and defining a cell cavity. The Electrolyzer Cell may also include a plurality of positive electrodes, wherein the plurality of positive electrodes are electrically connected together and a plurality of negative electrodes, wherein the plurality of negative electrodes are electrically connected together. The Electrolyzer Cell may further include an aqueous electrolyte containing a reversible, electro-active material, wherein the aqueous electrolyte, the plurality of positive electrodes and the plurality of negative electrodes are located within the cell cavity, and wherein each of the plurality of positive electrodes are configured to be spaced apart from each of the plurality of negative electrodes.

An Electrolyzer Cell System (SECS) having a plurality of Electrolyzer Cells (EC), wherein each of the plurality of Electrolyzer Cells are configured to store electrical energy on charge and generate spontaneous hydrogen on discharge is provided. It should be appreciated that in accordance with one embodiment, each of the Electrolyzer Cells includes a cell casing having a casing bottom and defining a cell cavity, a plurality of positive electrodes, wherein the plurality of positive electrodes are electrically connected together, a plurality of negative electrodes, wherein the plurality of negative electrodes are electrically connected together, and an aqueous electrolyte containing a reversible, electro-active material, wherein the aqueous electrolyte, the plurality of positive electrodes and the plurality of negative electrodes are located within the cell cavity, and wherein each of the plurality of positive electrodes are configured to be spaced apart from each of the plurality of negative electrodes.

A method for spontaneously generating hydrogen gas via an Electrolyzer Cell, wherein the Electrolyzer Cell defines a cell cavity and includes a plurality of positive electrodes, a plurality of negative electrodes, and an aqueous electrolyte containing a reversible, electro-active material contained within the cell cavity, is provided. In accordance with one embodiment, the method includes introducing electricity into the electrolyzer cell until the reversible, electro-active material is charged with electricity, i.e., is converted to its reduced state, operating the electrolyzer cell to cause the reduced reversible, electro-active material to discharge, i.e., convert to its oxidized state and generate hydrogen gas into the cell cavity and removing the generated hydrogen gas from the cell cavity.

A method for generating, compressing and storing hydrogen gas using a Spontaneous Electrolyzer System (SES), wherein the Spontaneous Electrolyzer System (SES) includes at least one compressor and at least one Electrolyzer Cell (and/or a Spontaneous Electrolyzer Cell System (SECS)), having a cell cavity which contains a reversible electro-active material located within an aqueous (water based) electrolyte is provided. The method includes introducing electricity into the Electrolyzer Cell (or SECS) to cause the reversible, electro-active material to be charged (converted to its reduced state) and converting the charged (reduced) reversible, electro-active material into its discharged (oxidized) state by applying an electrical load to the Electrolyzer Cell (or SECS) to cause an electrical current to flow through the electrical load and to spontaneously generate hydrogen gas within the Electrolyzer Cell (or SECS). The method further includes controllably venting the hydrogen gas from the cell cavity (or multiple cell cavities in the case of SECS) and introducing the hydrogen gas to a compressor to generate compressed hydrogen gas and storing the compressed hydrogen gas in a storage device/facility.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures:

FIG. 1B illustrates an exploded side transparent view of an electrolyzer cell configured for spontaneous electrolysis, in accordance with another embodiment of the invention.

DETAILED DESCRIPTION

Figure 1A:
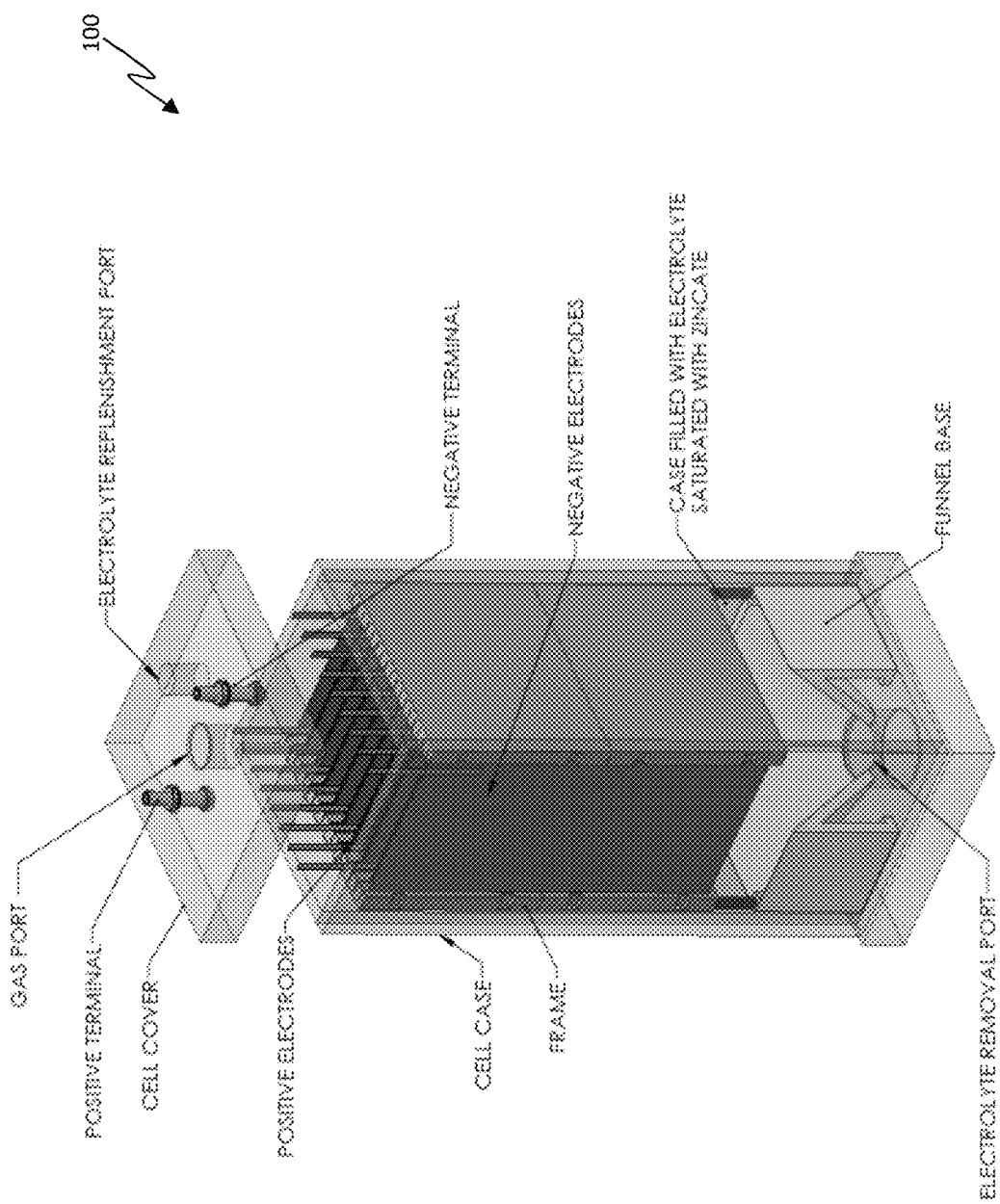
FIG. 1A illustrates a side transparent view of an electrolyzer cell configured for spontaneous electrolysis, in accordance with one embodiment of the invention.

It should be appreciated that the present invention provides one embodiment of a unique and novel device and method that spontaneously electrolyzes water to generate hydrogen thereby eliminating the requirement for compressing and storing the hydrogen, wherein as used herein, a 'spontaneous' process is a process that once started, continues on its own without any additional input energy. It should be appreciated that one embodiment of the present invention is disclose herein with regards to zinc being used as the electro-chemical material that acts as a reversible, electro-active material. This is because zinc has a high enough "half-cell" voltage (potential) that can drive the electrolysis (water splitting) hydrogen generation reaction "spontaneously" (without requiring external input energy). Additionally, "zinc-ion" in solution is used because by reversibly going between "plated zinc metal" (charged state) and "zinc-ion" in solution (discharged state) an "energy storage device" with an "infinite" cycle life is generated. It should be appreciated that, in one embodiment, conducting a post discharge procedure (as discussed hereinafter) and periodically introducing new electrolyte into the electrolyzer cell helps to allow for the unique and novel characteristic.

It should be further appreciated that although one embodiment of the present invention is being disclosed herein with regards to zinc being the "reversible electro-active material", other embodiments of the present invention may be implemented using any "reversible electro-active material" that changes its state (i.e., chemical structure) when it is charged (i.e., converted to its reduced chemical state) and/or discharged (i.e., converted to its oxidized chemical state). For example, when a voltage (that causes an electric current to flow) is applied to an electrode at least partially comprised of this reversible electro-active material within an electrochemical system, suitable to the desired end purpose. To clarify, reduction occurs when a reactant gains electrons during reaction, and oxidation occurs when a reactant loses electrons during reaction. The corresponding oxidation and reduction reactions occur as a result of the applied voltage and corresponding transfer of electrons when an electric current flows as a result of an applied voltage in an electrochemical system. The electrochemical system may have a positive electrode, a negative electrode, and an electrolyte, wherein the negative electrode may be partially and/or wholly constructed of this "reversible electro-active material", and the positive electrode may be partially and/or wholly constructed of a material that can catalyze the electrochemical formation of hydrogen and oxygen gas from an aqueous electrolyte. The reduction of this reversible electro-active material (at the negative electrode) occurs during a "charge" process and the oxidation of this reversible electro-active material (at the negative electrode) occurs during a "discharge" process. Correspondingly, during these processes, the generation of oxygen gas occurs during the "charge" process (at the positive electrode) and the generation of hydrogen gas occurs during the "discharge" process (at the positive electrode). Such materials, that have been defined herein as a "reversible electro-active material" may include "zinc-ion" (in solution) converting to "zinc metal" or zinc-oxide (solid) converting to zinc metal (solid). Accordingly, any reversible, electro-active material that has a sufficiently high "half-cell" potential (voltage) in its reduced state to either fully or partially drive the "electrolysis of water" reaction to generate hydrogen gas may be used, such as, for example, one or more of Zinc/Zinc-oxide (including all oxides of zinc in solid and soluble form in electrolyte); Pb/Pb oxide (including all oxides of pb in solid and soluble form in electrolyte); Fe/Fe oxide (including all oxides of iron in solid and soluble form in electrolyte); Cd/Cd oxide (including all oxides of cadmium in solid and soluble form in electrolyte); Metal Hydrides (for example, of the AB5 or AB2 type mischmetals); Vanadium and its ions and/or Sodium and its ions.

Accordingly, in one embodiment of the present invention the spontaneous device is an electrolyzer that electrolyzes water in two steps. The first step involves introducing electricity into the device, wherein the electrical energy is stored by converting the electrical energy into chemical energy via a reversible, electro-active material, in this case zincate, to zinc metal and concurrently generating oxygen gas which is vented out of the device. The second step involves generating hydrogen gas via "spontaneous electrolysis," wherein the chemical energy stored within the zinc metal is released when it is converted to zincate, thereby providing electrical energy required for electrolyzing the water to produce hydrogen as needed for immediate use. This device and method advantageously allows electrical energy to be introduced and stored within the electrolyzer during an off-peak period when electricity is inexpensive and mostly renewable or charged directly with renewable power. The device can then be discharged as desired (i.e., such as during an on-peak electricity period) thereby generating spontaneous, on-demand hydrogen that can be delivered to a burner (boiler or furnace) for heat, a turbine or engine for combined heat and power, fuel cell for power, and/or as a chemical feedstock, such as a reducing agent for clean steel production.

It should be appreciated that the unique feature of spontaneous hydrogen generation advantageously allows for hydrogen to be generated as desired and burned or oxidized at "time-of-generation", thereby eliminating the requirement of compression and storage. It is important to note that conventional electrolyzers require input energy during the hydrogen generation phase to generate hydrogen. Therefore, from an energy perspective, the hydrogen generated from "conventional electrolysis" requires compression and storage prior to use because burning/oxidizing hydrogen at "time of generation" from a conventional electrolyzer is energetically counterproductive, i.e., more energy is required to split the water than is delivered in the form of heat or power during the burning/oxidation process. In the present invention, zincate, which is a reversible, electro-active material, is used to store energy for later use. However, conventionally, the inherent properties of zinc pose technical challenges that have historically limited the life of zinc-based electrochemical energy storage devices. These properties include the solubility and precipitation, solidification, and accumulation of zinc particles in electrolyte which is an inevitable consequence of the reduction and oxidation of zinc during the charge and discharge process, respectively.

Additionally, the precipitation/solidification process of zinc results in the loss of "electro-active material" and thus, the loss of delivered hydrogen capacity with each cycle. Moreover, another inherent property that limits the life of zinc-based electrochemical device involves the dendritic growth of zinc during charge which can cause an electric short if the dendrite physically bridges from the negative electrode to the positive electrode. It should be appreciated that uncontrolled dendritic growth is undesirable because if the electrolyzer of the present invention experiences a dendritic short, a 'self-discharge' may occur resulting in a premature and uncontrolled release of hydrogen gas during and following the charge step. It should be further appreciated that one or more embodiments of the present invention addresses these challenges.

In accordance with the present invention, the invention described herein provides an electrolyzer cell and method for spontaneously and controllably generating hydrogen gas. Furthermore, in accordance with the present invention, the invention provides an article and method for implementing and enabling the electrolyzer cell to have a long cycle life.

Figure 1C:
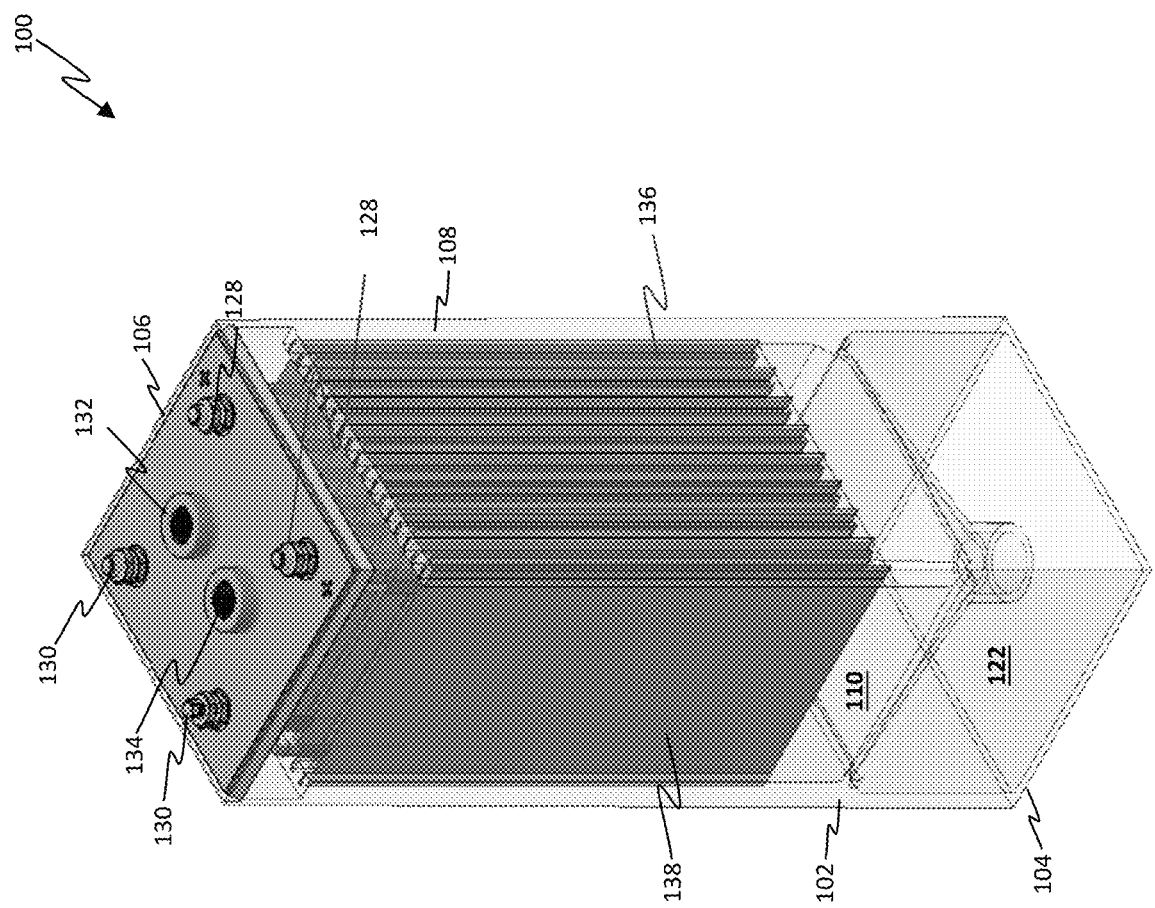
FIG. 1C illustrates a side transparent view of the electrolyzer cell of FIG. 1B.

Referring to FIG. 1A, FIG. 1B and FIG. 1C, an electrolyzer cell 100 is shown in accordance with one embodiment of the present invention, wherein the electrolyzer cell 100 is configured to spontaneously electrolyze an electrolyte solution to generate hydrogen. The electrolyzer cell 100 includes a cell case 102 having a case bottom 104, a case top 106 and case sides 108, wherein the case bottom 104, case top 106 and case sides 108 define a cell cavity 110. It should be appreciated that the cell cavity 110 of the electrolyzer cell 100 may be configured to contain approximately four (4) gallons of electrolyte. However, the electrolyzer cell 100 may be configured to have any capacity as desired suitable to the desired end purpose. The electrolyzer cell 100 further defines an electrolyte removal port 112 and includes a cell base 114, wherein the cell base 114 includes a base top 116, a base bottom 118 and base side walls 120 which define an angled shaped (such as a funnel, triangle, or bowl shaped) base cavity 122. It should be appreciated that the base bottom 118 defines a base bottom opening 124 which is communicated with the electrolyte removal port 112, wherein the electrolyte removal port 112 includes a port cover 126 which is removably configured to cover electrolyte removal port 112 to allow any precipitated zinc to be removed and/or electrolyte to be removed. The case top 106 includes one or more positive terminals 128, one or more negative terminals 130 an electrolyte replenishment port 132 and a gas port 134, wherein the gas port 134 is configured to allow gases that build up inside the cell cavity 110 to vent out. The electrolyzer cell 100 includes a plurality of positive electrodes 136 and a plurality of negative electrodes 138 which are held in place via a case frame 140, wherein the plurality of positive electrodes 136 and plurality of negative electrodes 138 are configured apart from each other so as not to directly contact each other. It should be appreciated that the cell cavity 110 is filled with an electrolyte solution which is saturated with Zincate.

Figure 2:
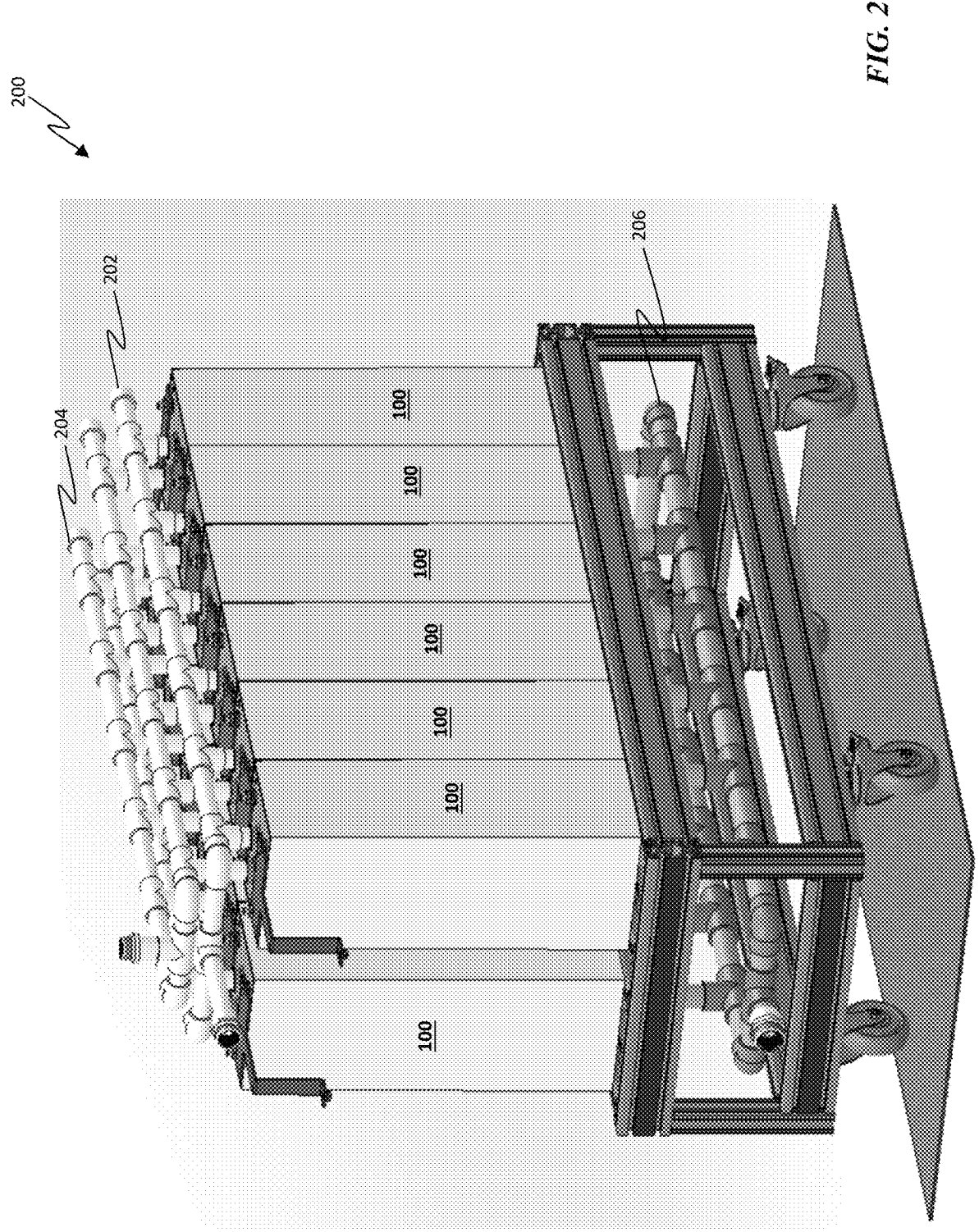
FIG. 2 illustrates a front side view of a Spontaneous Electrolyzer Cell System (SECS) which includes a plurality of the electrolyzer cells of FIG. 1A or FIG. 1B, in accordance with one embodiment of the invention.

Referring to FIG. 2, it should be appreciated that the Electrolyzer Cell 100 may be connected to other Electrolyzer Cells 100 in a series and/or parallel configuration to form a Spontaneous Electrolyzer Cell System (SECS) 200 or module of Spontaneous Electrolyzer Cells 100. The Electrolyzer Cells 100 may be connected in series or parallel via the positive terminals 128 and negative terminals 130 of each of the Electrolyzer Cells 100 via an "inter-cell" connector which may be constructed of an electrically conductive material, such as copper. Moreover, the electrolyte replenishment ports 134, the electrolyte removal ports 112, and the gas ports 132 of each of the Electrolyzer Cells 100 may be connected to each other via a manifold plumbing system, respectively.

Additionally, the Electrolyzer Cell(s) 100 may be connected via their positive terminal 128 and their negative terminals 130 to a power supply during charge to store electrical energy and may be connected to a load or an electric conductor during discharge to spontaneously generate hydrogen gas. As shown in FIG. 2 and as discussed hereinabove, a plurality of the electrolyzer cells 100 may be grouped together to form the Spontaneous Electrolyzer Cell System (SECS) 200. In this embodiment, the Spontaneous Electrolyzer Cell System (SECS) 200 is shown having twelve (12) electrolyzer cells 100. It should be appreciated that in one or more embodiments, the Spontaneous Electrolyzer Cell System (SECS) 200 may include one or more of electrolyte replenishment tubing 202, gas venting tubing 204 and electrolyte removal tubing 206, wherein the electrolyte replenishment tubing 202 is in flow communication with the electrolyte replenishment ports 132 of each of the electrolyzer cells 100, the gas venting tubing 204 is in flow communication with the gas venting ports 134 of each of the electrolyzer cells 100 and the electrolyte removal tubing 206 is in flow communication with the electrolyte removal ports 112 of each of the electrolyzer cells 100.

This configuration advantageously allows each of the electrolyzer cells 100 to have the electrolyte contained therein to be replenished via the electrolyte replenishment tubing 202, the gas generated within each of the electrolyzer cells 100 to be vented via the gas venting ports 204 and the depleted electrolyte (and any dendritic material) to be removed via the electrolyte removal tubing 206. It is contemplated that, in one or more embodiments, the Spontaneous Electrolyzer Cell System (SECS) 200 may include one or more controllable flow valves to control the flow of electrolyte into and/or depleted electrolyte (and/or gas) out of each of the electrolyzer cells 100.

Figure 3:
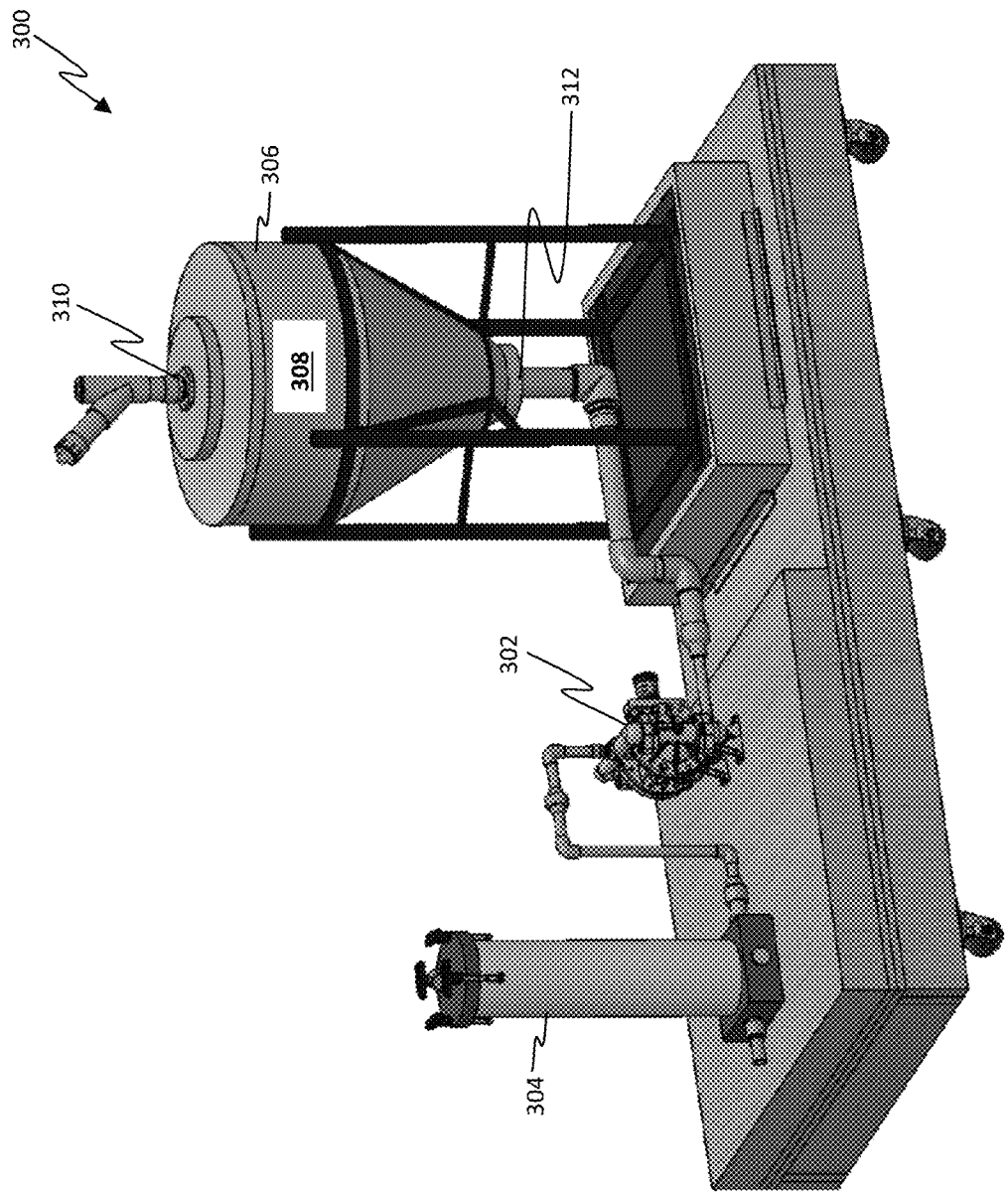
FIG. 3 illustrates a side view of a 'maintenance system' for the electrolyzer cell of FIG. 1A and FIG. 1B and for the SECS of FIG. 3, in accordance with one embodiment of the invention.
Figure 4:
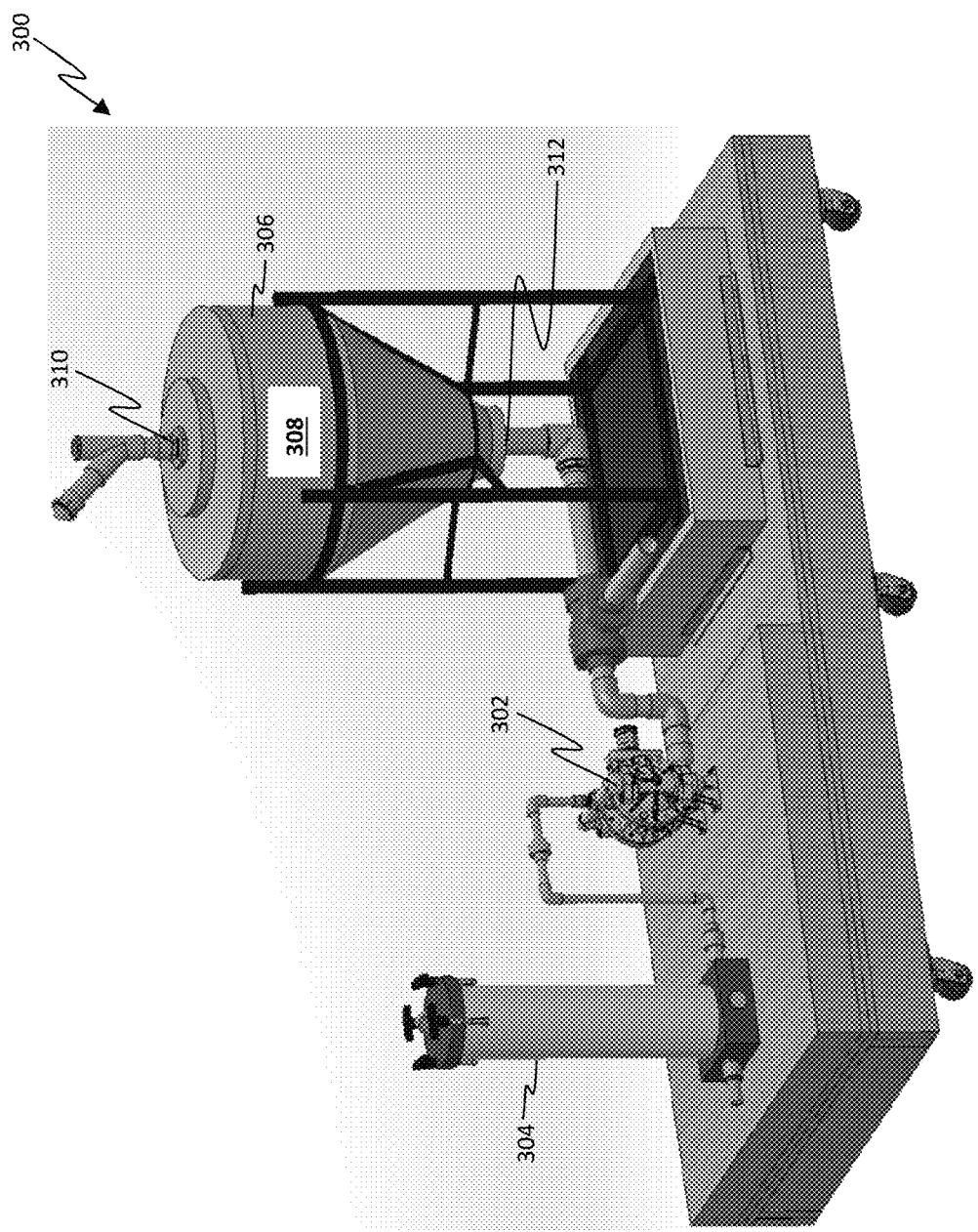
FIG. 4 illustrates a side view of a 'maintenance system' for the electrolyzer cell of FIG. 1A and FIG. 1B and for the SECS of FIG. 3, in accordance with another embodiment of the invention.

Referring to FIG. 3, it should be further appreciated that in other embodiments of the invention, the SECS 200 may be connected to a "maintenance system" 300 which may include a pump (302), a filter (304), and/or an electrolyte hopper (306), wherein the pump (302) may act to mechanically remove electrolyte and other particulates (i.e., dendritic material) from the cell cavities 110, the filter (304) may act to remove particulates from the aqueous electrolyte, and the electrolyte hopper (306) may contain fresh electrolyte and may act to replenish the fresh electrolyte to the cell cavities 110 of the Electrolyzer Cells 100.

In one embodiment, the electrolyte hopper (306) may define a hopper cavity (308) for containing fresh aqueous electrolyte, a first hopper port (310) for replenishing the hopper cavity (308) with the fresh aqueous electrolyte, a second hopper port (312) for adding zinc oxide to the fresh aqueous electrolyte, wherein the zinc oxide dissolves into soluble zincate in the alkaline aqueous electrolyte such that a stable and fully saturated electrolyte can be maintained and delivered to the Electrolyzer Cells 100. It should be appreciated that in other embodiments, the dissolution rate of converting zinc oxide to soluble zincate can be increased by adding heat to the hopper (306) or by circulating/stirring the aqueous electrolyte in the hopper cavity (308). Moreover, as discussed hereinabove, the electrical method 600 for minimizing or eliminating dendritic growth on the negative electrode 130 may be performed on the Electrolyzer Cell(s) 100 and includes applying a voltage (in the range of −1.5 V/cell-0 V/cell) across the positive terminal 128 and negative terminal 130 of the Electrolyzer Cell(s) 100 for a predetermined amount of time after a discharge or prior to a charge. It should be appreciated that the predetermined amount of time may be at least partially dependent on the size of the system and the number of Electrolyzer Cells 100 in the system. In one embodiment the voltage to be applied is −1 V/cell. It should be further appreciated that the electric current passing through one or more of the Electrolyzer Cell(s) 100 may be limited to prevent the current from exceeding a desired negative voltage per cell, such as −1 V/cell. One embodiment for accomplishing this may be to connect a diode in parallel to the positive terminal 128 and the negative terminal 130 of the one or more Electrolyzer Cell(s) 100.

In accordance with one embodiment, the Electrolyzer Cell(s) 100 as disclosed herein uses zincate as a reversible, electro-active material to controllably and spontaneously store and release energy. However, it is contemplated that in one or more other embodiments, other reversible, electro-active materials may be used as desired. Additionally, it should be appreciated that although the Electrolyzer Cells 100(s) is disclosed as having an electrolyte removal port 112 for removing electrolyte and dendritic material from the cell cavity 110 and an electrolyte replenishment port 132 for replenishing electrolyte into the cell cavity 110, it is contemplated that only one port may be included and may be used for both removing electrolyte and dendritic material from the cell cavity 110 and replenishing the cell cavity 110 with electrolyte.

It should be appreciated that in the present invention, zincate is used as a reversible, electro-active material, wherein zincate is soluble in aqueous potassium or sodium hydroxide up to 6% by weight (when fully saturated), which corresponds to approximately 50 Amp hours (Ah)/liter of electrolyte. However, 'super-saturated' solutions having greater values are possible, wherein the higher capacity (i.e., super-saturation) may be achieved by replenishing depleted electrolyte (i.e., after a charge process where the zincate ion in solution is plated as zinc metal onto the negative electrodes during the charging process) with fully saturated electrolyte (such as may be supplied from an 'electrolyte hopper') and continuing the charging process. This process can be repeated several times. Then, after the subsequent discharge (i.e., zinc metal dissolves back to soluble zincate ion), the electrolyte will be 'super-saturated.' As such, the electrolyte can achieve approximately 3-5 times the capacity on the subsequent charge (without having to introduce additional electrolyte).

It should be further appreciated that charge is typically based on 'capacity in' (i.e., a charge current (Amps) for a set amount of time (hours) giving capacity (Ah).

Thus, a fully charged cell (i.e., when the electrolyte is depleted of zincate) is determined by voltage and 'cell cutoff' is defined as increase in voltage of greater than (>) 0.1 volts from a 'baseline, steady-state' voltage, wherein the 'baseline, steady-state' voltage is rate (Amps) dependent and also dependent on the electrode spacing, morphology and materials of the electrodes. In one embodiment, the Electrolyzer Cell(s) 100 uses copper foil and nickel foam as the material (i.e., copper foil—negative, nickel foam—positive,) and a spacing of ⅜ inch. In this embodiment, the 'baseline' voltage (i.e., when the zincate in electrolyte is not yet depleted) is 2.45 V (at a 250 mA/in$^2$ charge rate) and cell cutoff voltage is 2.6 V. At a slower charge rate (i.e., such as 125 mA/in$^2$), the 'baseline' voltage may be 2.25 V and the charge cutoff is 2.4 V. It should be appreciated that the Electrolyzer Cell(s) 100 may be designed in many different variations and charge rates and voltages are dependent on the design of the Electrolyzer Cell(s) 100. As such, this invention contemplates other design characteristics (i.e., Materials, spacing, reversible, electro-active material) which fall within the scope of the invention, and which may depend upon the desired end purpose.

Figure 5:
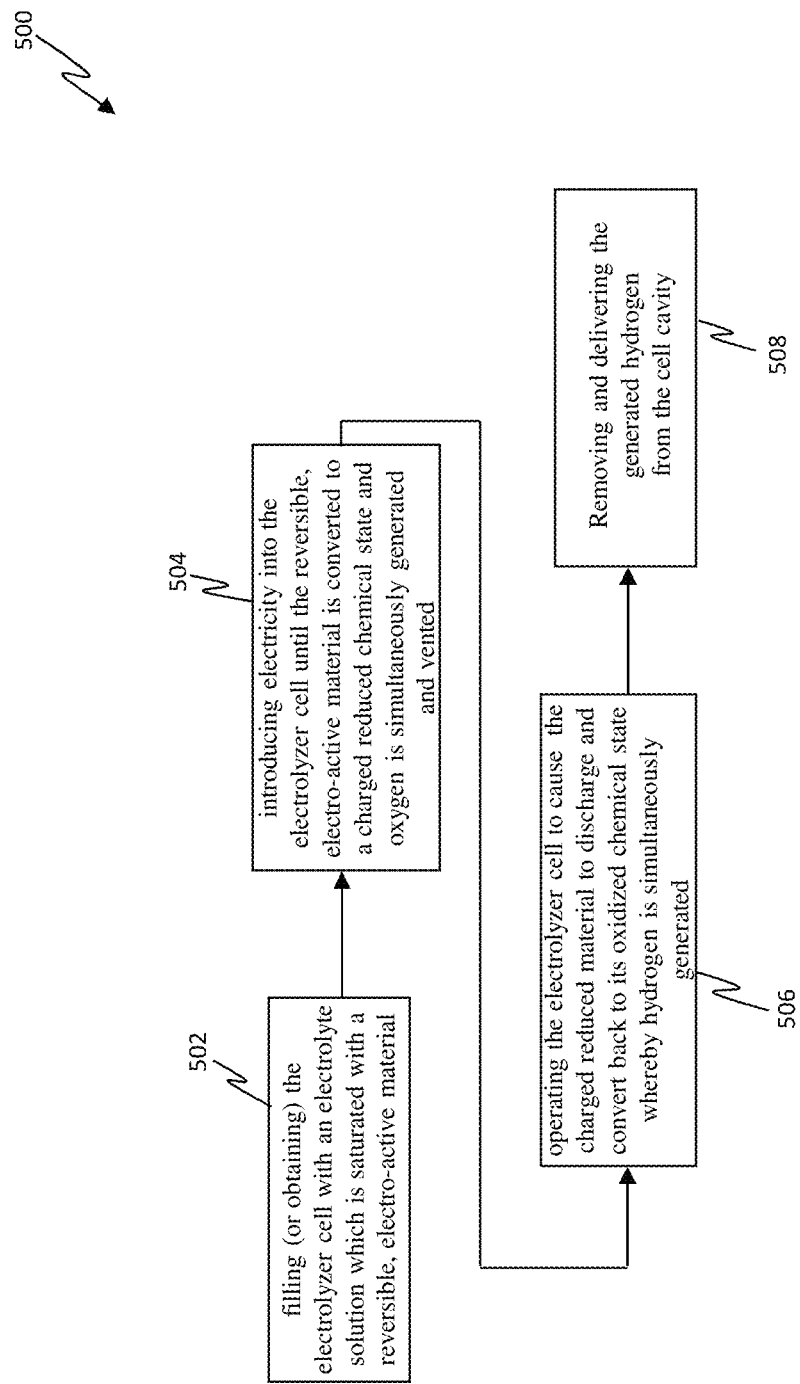
FIG. 5 shows an operational block diagram illustrating a method for implementing and maintaining the electrolyzer cell of FIG. 1A, FIG. 1B, FIG. 1C and FIG. 2, in accordance with one embodiment of the invention.

Referring to FIG. 5, a method 500 for implementing and maintaining the Electrolyzer Cell 100 is provided and includes filling (or obtaining) the Electrolyzer Cell 100 with an electrolyte solution which is saturated with Zincate, as show in operational block 502. The Electrolyzer Cell 100 is 'charged' by introducing electricity to the Electrolyzer Cell 100 via the positive terminal 129 and the negative terminal 130 until the reversible, electro-active material (i.e., Zincate) is fully charged, i.e., reduced (or as charged as desired), as shown in operational block 504. It should be appreciated that this 'charging' phase causes oxygen to be generated within the cell cavity 110. Accordingly, the oxygen that is generated during the 'charging' phase is removed from the cell cavity 110 out of the gas port 134. The Electrolyzer Cell 100 is then operated to cause the reversible, electro-active material to discharge, i.e., oxidized, as desired (i.e. such as during an on-peak electricity period) to generate spontaneous, on-demand hydrogen, as shown in operational block 506 and the generated hydrogen is then removed from the cell cavity 110 via the gas port 134, as shown in operational block 508. It should be appreciated that the generated hydrogen may be used as desired, such as delivered to a burner for heat, a turbine or engine for combined heat and power, fuel cell for power, and/or as a chemical feedstock, such as a reducing agent for clean steel production.

As discussed briefly hereinabove, the accumulation of precipitated zinc not only results in the loss of hydrogen capacity with time, but it also may lead to electrical shorts if the precipitated zinc bridges the positive and negative electrodes. Accordingly, it may be desirable to remove the precipitated zinc periodically. It should be appreciated that in one embodiment, the base cavity 122 may be "funnel-shaped" to receive and direct any precipitated zinc material (i.e., dendrites) to the electrolyte removal port 112 to aid in removal of precipitated zinc. It should be further appreciated that in another embodiment, the electrolyte removal port 112 and/or the electrolyte replenishment port 132 may be connected to a 'maintenance system' which may include a pump, a filter and an electrolyte hopper. This type of system may allow the electrolyzer cell 100 to be continuously (and/or periodically) maintained. For example, the pump may act to mechanically remove electrolyte containing precipitated zinc from the cell cavity 110 via the electrolyte removal port 112, feed the removed electrolyte through a filter to remove the precipitated zinc particles and deposit the filtered electrolyte into an electrolyte hopper where the filtered electrolyte may be used to replenish the electrolyte back into the cell cavity 110.

It should be appreciated that the electrolyte hopper may include dissolved zinc, such that when the filtered electrolyte is deposited into the electrolyte hopper, the electrolyte may be replenished with zinc to be fully saturated with soluble zincate. Accordingly, the electrolyte hopper may include an input port for fluid (such as water) and zinc oxide additions to allow the 'maintenance system' to maintain the electrolyte hopper with an electrolyte that is fully saturated with zincate (zinc oxide dissolves into soluble zincate in potassium or sodium hydroxide electrolyte). The "maintenance system" described above advantageously allows the Electrolyzer Cell 100 to maintain a stable amount a soluble zincate in the electrolyte and therefore a stable hydrogen delivery capacity with cycling.

It should be appreciated that the charging and discharging of the Electrolyzer Cell 100 is shown in the equations listed below. During the charging process, zincate is charged to zinc metal by applying a potential difference (i.e., voltage) greater than 1.6 V per cell across the positive and negative terminals. This may be accomplished via a power supply or any other power/voltage source suitable to the desired end purpose (i.e., solar cells, wind turbines, power grid, batteries, etc.). The zincate is converted to zinc on the negative electrode and oxygen is generated from hydroxyl ions (OH—) in an aqueous (water based) electrolyte on the positive electrode (See equations 1). During discharge, zinc metal is discharged to zincate ion by connecting the positive and negative terminals to an electric load (i.e., such as a resistor, or any other type of electric load) that can provide a 'discharge current.' In one embodiment, the discharge voltage is less than (<) 0.4 V. Zinc is converted to zincate ion at the negative electrode and hydrogen is generated from water on the positive electrode (See equation 2). It should be appreciated that the Electrolyzer Cell 100 may not include a pump to remove either the hydrogen or oxygen, although one may be included if desired. These gases are less dense than the electrolyte and thus, move to the surface and outlet port via natural convection. Moreover, it should be appreciated that these gases are generated at a differential positive pressure above atmospheric pressure (i.e., the pressure of which can be controlled by a regulator at the 'outlet gas port' of a system) and therefore, these gases 'flow' to their desired destination (application) by being generated at a higher pressure than atmospheric pressure.

Figure 6:
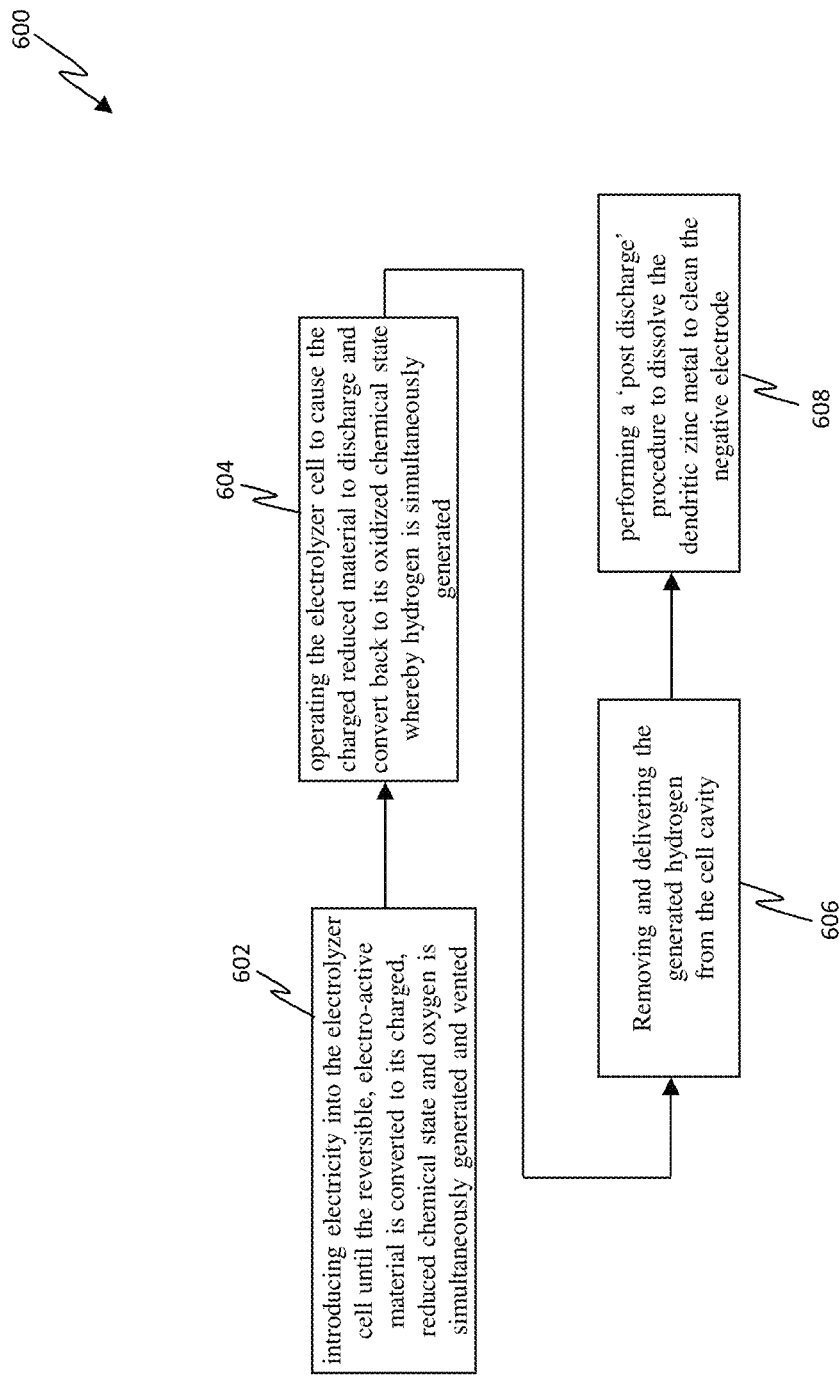
FIG. 6 shows an operational block diagram illustrating a method for reducing/preventing a dendritic zinc short circuit in the electrolyzer cell of FIG. 1A, FIG. 1B, FIG. 1C and FIG. 2, in accordance with one embodiment of the invention.

Referring to FIG. 6, a method 600 for reducing/preventing a dendritic zinc short circuit in the Electrolyzer Cell 100 is provided, in accordance with one embodiment of the invention. The method 600 includes charging the Electrolyzer Cell 100 by introducing electricity to the Electrolyzer Cell 100 via the positive terminal 129 and the negative terminal 130 until the reversible, electro-active material (i.e. Zincate) is fully charged, i.e., reduced, (or as charged as desired), as shown in operational block 602. It should be appreciated that this 'charging' phase causes oxygen to be generated within the cell cavity 110. Accordingly, the oxygen that is generated during the 'charging' phase is removed from the cell cavity 110 out of the gas port 134. The Electrolyzer Cell 100 is then operated to cause the reversible, electro-active material to discharge, i.e., oxidized, as desired (i.e. such as during an on-peak electricity period) to generate spontaneous, on-demand hydrogen, as shown in operational block 604 and the generated hydrogen is then removed from the cell cavity 110 via the gas port 134, as shown in operational block 606.

The method 600 further includes performing a 'post discharge' procedure, as shown in operational block 608, wherein the 'post discharge' procedure includes introducing a negative voltage across the positive terminal 129 and the negative terminal 130 (such as for example −1.5-0 volts/cell) for a predetermined period of time. This post discharge procedure enhances the dissolution of zinc metal to soluble zincate, thereby "cleaning" the negative electrode surface prior to the subsequent charge, which in turn significantly reduces or eliminates the development of dendritic electrical shorts. It should be appreciated that this post discharge procedure is beneficial because pockets of metallic zinc that did not fully discharge can remain on the negative electrode surface even after a discharge is terminated. These pockets of metallic zinc can act as surfaces for enhanced dendritic growth on the subsequent charge, which in turn, can lead to build-up of dendritic growth and thus, an electric short if the dendritic build-up bridges to the positive electrode. As described previously, an electric short results in "self-discharge" and hydrogen generation during a period it is unwanted. The "post discharge procedure" may be performed to advantageously remove any "undischarged" pockets of metallic zinc that may remain on the negative electrode surface.

It should be appreciated that when using zinc to generate hydrogen gas, the benefits of an alkaline electrolyte (potassium or sodium hydroxide) as compared to an acid electrolyte (such as, sulfuric or hydrochloric acid) are recognized. Zinc is unstable in an acid electrolyte, which is a drawback for energy storage applications. Thus, in an acid electrolyte, zinc formed during charge immediately starts "self-discharging" to ionic zinc and the simultaneous formation of hydrogen gas both during and on completion of the charge. As such, hydrogen gas is generated during a period it is unwanted, and thus is either lost completely or must be compressed and stored, which is costly. For example, one objective may be to charge a zinc system using intermittent renewable power sources, such as wind and/or solar, and then to "discharge" zinc to deliver hydrogen gas at a later time for heat and/or power. Due to the intermittent nature of solar and wind power, there will be periods when the zinc system is not charging, but the delivery of hydrogen gas is not yet desired. This may be true even if the source of the charge power is not wind or solar. Thus, in an acid electrolyte, zinc will immediately start "self-discharging" and prematurely releasing hydrogen gas. However, zinc is stable in a basic, alkaline electrolyte and there is no or minimal conversion of zinc-to-zinc ion and simultaneous hydrogen release during or following charge. Thus, there is no or minimal hydrogen capacity loss and in an alkaline electrolyte, charged zinc can be triggered electrically to generate hydrogen gas "on-demand" and when needed for delivery for heat, power, or as a chemical feedstock.

It should be appreciated that in many zinc-based energy storage devices, membranes or separators are used that are electrically insulating and ionically conductive, specifically for the hydroxyl ion. In zinc-based devices, examples of membrane material include cellulose, microporous polyethylene, microporous polypropylene, and other engineered plastics. The membrane or separator serves to electrically isolate the negative and positive electrodes from each other, while allowing for ionic conductivity. In addition to electrically separating the positive and negative electrodes, the separator also serves to physically block zinc dendrites, which grow during charge, from bridging the negative and positive electrodes, thus causing a short. Even in cells that incorporate membranes or separators, dendritic zinc bridges do occur with repeated cycling, due to the porous nature of these materials and the fact that the physical properties of these membranes degrade over time. Bridging can also result from overcharging. When a zinc dendritic bridge does occur, they are typically not reversible, i.e., the bridge penetrates the porous structure of the membrane/separator, becoming imbedded in the membrane. When this occurs, the result is significantly reduced performance or the end of life of the cell. The dendritic nature of zinc typically limits the cycle-life or calendar life of zinc based energy storage devices.

However, in at least one embodiment, the present invention does not require a membrane or separator. Rather, the positive and negative electrodes are spaced apart from each other, such that they do not touch, without a membrane or separator in-between. In one embodiment, the typical spacing between the positive and negative electrodes may be in the range of about 1/16 inches to about 1/2 inches. It should be appreciated that not including or requiring a membrane or separator has at least two benefits. First, it reduces the cost of the cell since membranes are expensive. Second, if and when a zinc dendritic bridge does occur, i.e., an internal electrical short develops, the absence of a membrane or separator allows for a full recovery from the short, thereby enabling a long cycle and calendar life device. This recovery does not occur on its own, but rather requires a discharge followed by the "post-discharge" procedure (described herein) and the appropriate amount of electrolyte (which may be defined by the spacing described above) between the electrodes and the appropriate amount of space below the electrodes, described hereafter. The "discharge/post-discharge" procedure causes the dendritic zinc bridge or zinc conglomerate to dissolve into the electrolyte, i.e., re-forming soluble zincate. Further, the reservoir of electrolyte within the cell must be sufficient to allow for the dendrite to dissolve when the discharge current is flowing. This is all controlled by the design of the cell.

It should be appreciated that in the presence of a membrane or separator, this "recovery procedure" would be hindered if not prevented since the dendrite would be imbedded in the porous structure of the membrane or separator which would inhibit the effect of the discharge/post-discharge procedure from dissolving the dendrite. As mentioned briefly above, the Electrolyzer Cell 100 may be designed with an adequate space below the electrodes, in one embodiment this may typically be about 1/2 inch to about 4 inches. This design advantageously enhances the full recovery from dendritic zinc bridges because it allows for a "drop zone" of the metallic zinc bridges or zinc conglomerates into the base of the cell that may contain a reservoir of electrolyte. The discharge/post-discharge procedure causes the zinc dendritic bridges and zinc conglomerates to detach from the electrode surfaces, fall into the electrolyte reservoir beneath the electrodes, and dissolve and/or be removed via the maintenance system as described herein. It should be further emphasized that if a membrane and separator are incorporated into cells by surrounding/enclosing the electrodes they inhibit this "drop zone" effect and thereby prevents achieving a long cycle-life and calendar life device. Accordingly, the combination of 1) the spacing between electrodes; 2) the size of the electrolyte reservoir beneath the electrodes; and 3) the lack of a membrane or separator, all contribute to having the desired effect of enabling a full recovery from zinc dendritic bridges and allowing for a long cycle and calendar life device.

Referring again to FIG. 1A, FIG. 1B and FIG. 1C, the Electrolyzer Cell 100 may include a plurality of positive electrodes 136 and negative electrodes 138, in accordance with one embodiment of the invention. The plurality of negative electrodes 138 may be constructed of metal, such as copper or copper foam, and the plurality of positive electrodes 136 may be constructed of a metal, such as nickel or nickel foam. The aqueous electrolyte is zincate ion fully or partially saturated in an alkaline electrolyte such as potassium or sodium hydroxide. It should be appreciated that, in one or more embodiments, multiple cells of the Electrolyzer Cell 100 of FIG. 1 may be constructed in series, parallel, or combinations thereof, to meet a desired input and output voltage during the charge and discharge procedures. Moreover, it should be appreciated that the electrolyte removal port 112 and/or electrolyte replenishment port 132 may serve for removal and replenishment of electrolyte such that the Electrolyzer Cell 100 may be able to cycle "indefinitely".

In accordance with one embodiment of the invention, the process of spontaneous electrolysis may be expressed as follows:

Charge Half-Cycle

When the charge half-cycle is initiated, the electrical energy required for electrolysis is stored in zincate. As the zincate in the electrolyte is reduced to Zn (converted to its high potential state) and oxygen is concurrently generated, the following is true:

$$Zn_{(aq)}^{2+} + 2e^- \rightarrow Zn_{(s)} \ (\Delta U = +1.25 \text{ V}) \quad \text{(1a, at negative)}$$

$$2(OH)^- \rightarrow H_2O + 1/2 O_2 + 2e^- (\Delta U = +0.40 \text{ V}) \quad \text{(1b, at positive)}$$

$$Zn_{(aq)}^{2+} + 2(OH)^- = Zn_{(s)} + H_2O + 1/2 O_2 \ (\Delta U = +1.65 \text{ V}, +45 \text{ kWh}_e/8 \text{ kg O}_2) \quad (1)$$

Discharge Half-Cycle

When the discharge half-cycle is initiated, Zn is oxidized back to zincate (converted to its low potential state), thereby delivering the electrical energy necessary to spontaneously electrolyze water to hydrogen gas (without any external energy input) and surplus electrical energy of 11 kWh$_e$ per kg H$_2$ is generated. This is shown below:

$$Zn_{(s)} \rightarrow Zn_{(aq)}^{2+} + 2e^- \ (\Delta U = -1.25 \text{ V}) \quad \text{(2a, at negative)}$$

$$2H_2O + 2e^- = 2(OH)^- + H_2 \ (\Delta U = +0.83 \text{ V}) \quad \text{(2b, at positive)}$$

$$Zn_{(s)} + 2H_2O \rightarrow Zn_{(aq)}^{2+} + 2(OH)^- + H_2 \ (\Delta U = -0.42 \text{ V}, -11 \text{ kWh}_e/\text{kg H}_2) \quad (2)$$

It should be appreciated that the entire cycle (i.e., the charge half-cycle and the discharge half-cycle) is simply the electrolysis of water and is given by:

$$H_2O \rightarrow H_2 + 1/2 O_2 \ (\Delta U = +1.23 \text{ V}, +34 \text{ kWh}_e/\text{kg H}_2) \quad (3)$$

It should be appreciated that, in the above, a positive value is used to denote input electrical energy and a negative value is used to denote output (generated) electrical energy. Equation (1) is the charge half-cycle, requiring a theoretical electrical energy input of +45 kWh$_e$/8 kg O$_2$. Equation (2) is the discharge half-cycle generating a theoretical electrical energy output of −11 kWh$_e$/kg H$_2$. Equation (3) is the full, round-trip cycle, which is simply the water electrolysis equation with a theoretical energy requirement of +34 kWh$_e$/kg H$_2$.

Thus, equation (1) is the "energy storage" step, where electrical energy is electrochemically stored by converting zincate to zinc, wherein O$_2$ gas is concurrently generated. As shown by equation (2), the stored energy is released when the discharge step is initiated and water is spontaneously electrolyzed to generate hydrogen gas (i.e., no input energy required). It should be further noted that the rate of spontaneous H$_2$ generation can be precisely controlled by adjusting the load (i.e., discharge current). It should be appreciated that another means of spontaneously generating the hydrogen gas is connecting the positive and negative terminals of the cell with an electrical conductor such as copper or any metal that conducts electric current. It should be further appreciated that, in one embodiment of the invention, the hydrogen gas generated spontaneously during the discharge half-cycle passes out the gas port 134 and can be passed to its intended application, such as heat, power, or as a chemical feedstock (reduction of iron ore for clean steel manufacturing). One advantage of the present invention, compared to conventional electrolyzers, is that hydrogen can be burned/oxidized in a furnace or engine or converted to electricity in a fuel cell at "time-of-generation" since the hydrogen is "spontaneously generated," (i.e., no input energy is required during the generation phase) thereby bypassing the "compression and storage" step, which is required of conventional, state-of-the-art electrolyzers.

It should be appreciated that although one embodiment of the present invention put some emphasis on eliminating hydrogen compression and storage costs via the unique and novel features and methods of the present invention for particular energy storage applications, there exists many other applications, such as seasonal or long-duration energy storage, where compression and storage of hydrogen is or may be required. Long-duration or seasonal energy storage is where, for instance, surplus renewable energy, in the spring or fall months, is typically harvested for use in winter, when heat demand is high. Moreover, a compressor can be any type of device that increases hydrogen from a low pressure to a higher pressure. Types of compressors may include electrochemical compressors and/or mechanical compressors and Hydrogen storage devices/facilities can include tanks and/or naturally occurring reservoirs, such as salt caverns.

As was discussed previously hereinabove, gas compression is costly, mainly due to the Capital Expense (i.e., CapEx) of compression, wherein the CapEx of compression is proportional to the power (kW) required to compress the Hydrogen. Typically, the CapEx of compression ranges between $1,000/kW-$4,000/kW of compression power, with the range depending on the compressor type and scale. The required power typically depends on the flow rate, input and output pressure, and the physical properties of the gas being compression. One expression that shows the relationship between these variables can be inferred from the Nernst equation of compression which is given as:

Required Power of Compression (kW)=$a$ V ln($P2/P1$), where P1 and P2 are the input and output pressure of the gas delivered to the compressor, V is the gas flow rate, and a is the proportionality constant which accounts for the physical properties of the gas and the efficiency. As shown by the Nernst equation, the power of compression, and therefore the CapEx of compression, is directly proportional to the flow rate of the gas. Thus, it stands to reason that any method that enables a user to decrease the flow rate of a gas required to store a given amount of electrical energy (such as Hydrogen gas) also reduces the CapEx of the gas compression.

Figure 7:
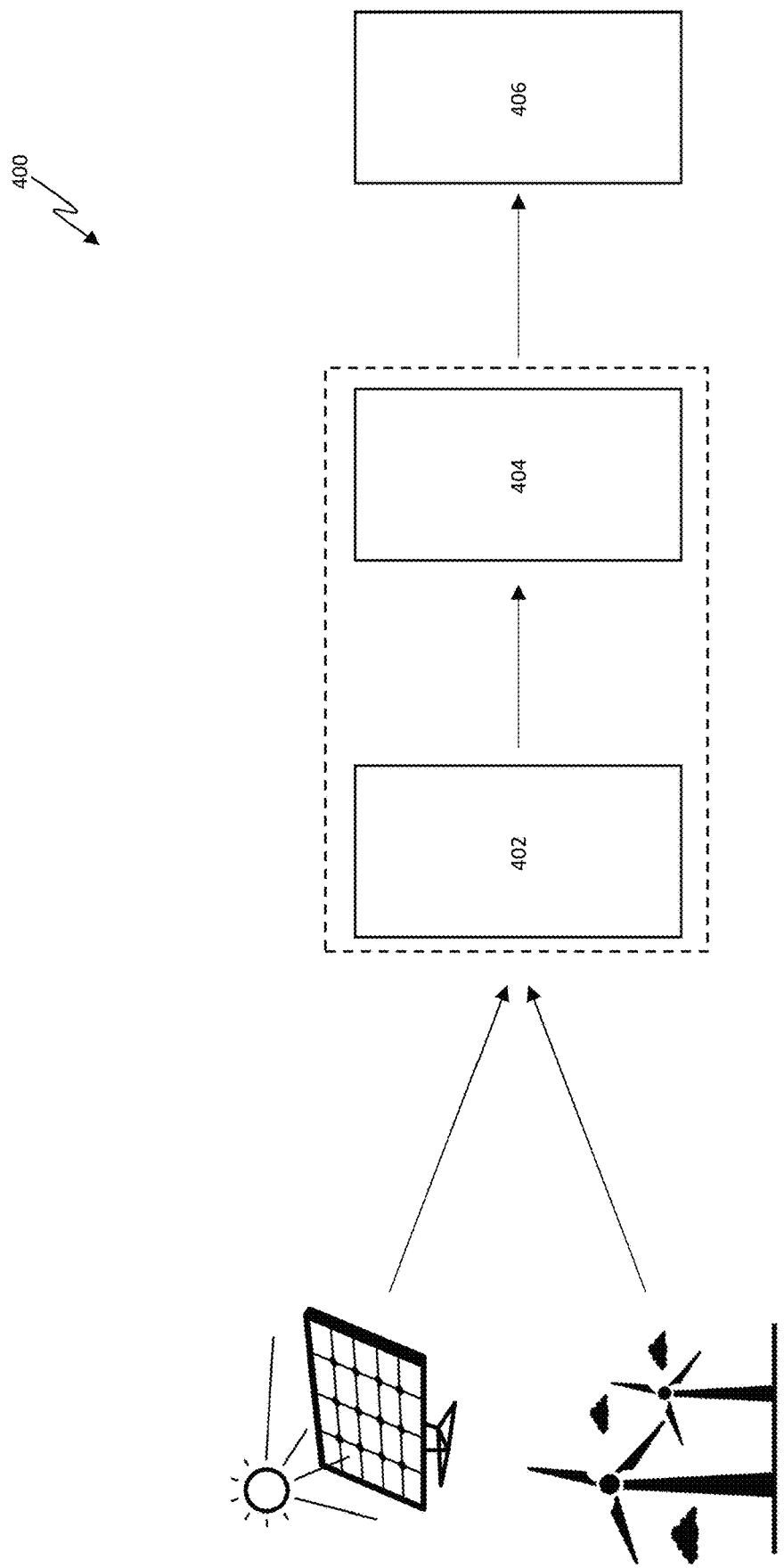
FIG. 7 illustrates an operational block diagram of a Spontaneous Electrolyzer System (SES) having the electrolyzer cell of FIG. 1A, FIG. 1B, FIG. 1C and FIG. 2 integrated with a compressor, in accordance with one embodiment of the invention.

Referring to FIG. 7, a Spontaneous Electrolyzer System (SES) 400 having an Electrolyzer Cell (or SECS) 402 integrated with a Compressor 404 is provided, in accordance with one embodiment of the invention, wherein the SES 400 is configured for long-duration energy storage applications. As discussed previously and referring to the Nernst equation, the output hydrogen generation flow rate from an electrolyzer equals the input flow rate fed to the compressor (i.e., V in the Nernst equation). Using a conventional electrolyzer, water is electrolyzed (i.e., split) in a single step, therefore the rate of input electrical energy and the hydrogen generation rate is "coupled". However, using the Electrolyzer Cell (or SECS) 402 of the present invention, water is electrolyzed (i.e., split) in two steps, therefore the rate of input electrical energy and the rate of hydrogen generation is advantageously "de-coupled". It should be appreciated that this "de-coupling" is explicit in the charge and discharge reactions of equations (1) and (2) hereinabove. Thus, the Electrolyzer Cell (or SECS) 402 can charge at one rate (i.e., oxygen flow rate) and can discharge at another rate (i.e., hydrogen flow rate), such as a lower rate. Therefore, the compression power required to compress an amount of hydrogen gas to an output pressure can be smaller than with a conventional electrolyzer. This feature is highly favorable for renewable energy storage applications, which may be intermittent. It should be appreciated that once the generated hydrogen gas is generated and compressed, the hydrogen gas may then be stored within a storage device/facility 406 for later use.

Figure 8:
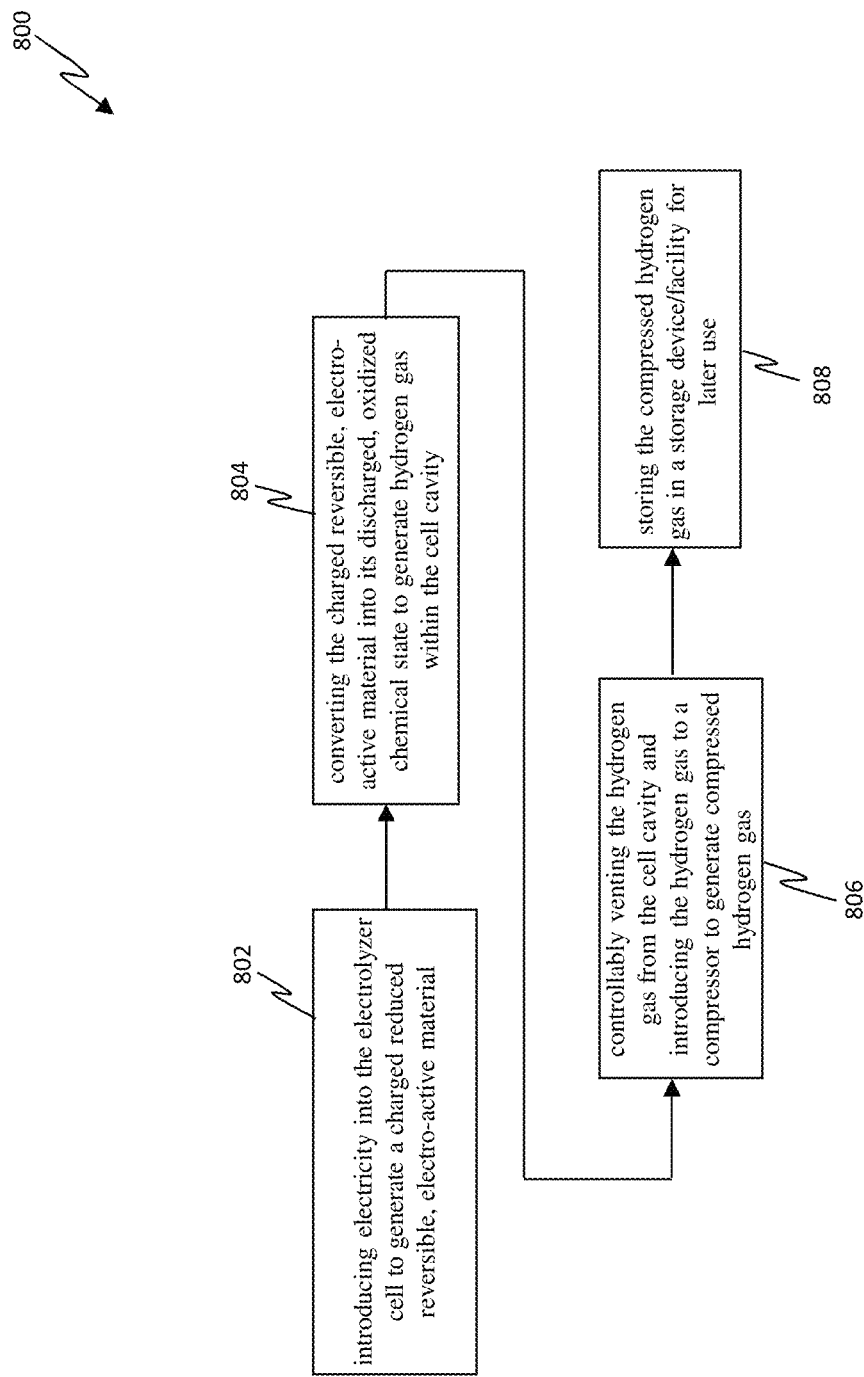
FIG. 8 shows an operational block diagram illustrating a method for generating, compressing and storing hydrogen gas using the Spontaneous Electrolyzer System (SES) having at least one Electrolyzer Cell (or SECS) integrated with at least one compressor, in accordance with one embodiment of the invention.

Referring again to FIG. 8, a method 800 for generating, compressing and storing hydrogen gas using the Spontaneous Electrolyzer System (SES) 400 having an Electrolyzer Cell (or SECS) 100, 402 integrated (and/or in flow communication) with a Compressor 404 is provided, in accordance with one embodiment of the invention. The method 800 includes introducing electricity into the Electrolyzer Cell 100, 402 to cause the reversible, electro-active material contained within the Electrolyzer Cell 100, 402 to be converted into a charged, reduced chemical state, as shown in operational block 802. It should be appreciated that the introduction of electricity into the Electrolyzer Cell 100, 402 may be performed during specific and limited times depending upon the source of the electricity. For example, if the source of the electricity are solar cells, then the introduction of electricity into the Electrolyzer Cell 100, 402 may occur only during daylight hours.

The method 800 further includes converting the charged, reduced reversible, electro-active material into its discharged, oxidized chemical state by applying an electrical load (and/or an electrical short, as desired) across at least one positive electrical terminal and at least one negative electrical terminal to cause an electrical current to flow through the electrical load, as shown in operational block 804. This causes the Electrolyzer Cell (or SECS) 100, 402 to generate hydrogen gas within the cell cavity (or cell cavities) 110. It should be appreciated that the rate that the hydrogen gas is generated by the Electrolyzer Cell (or SECS) 100, 402 may be controlled by controlling the electrical current flowing through the electrical load. The generated hydrogen gas may be controllably vented from the Electrolyzer Cell (or SECS) 100, 402 and controllably introduced into the compressor 404 to be compressed thereby generating compressed hydrogen gas, as shown in operational block 806. The compressed hydrogen gas may then be stored within a storage device/facility 406 (for example, a salt cavern which may be 100-200 bar) for later use, as shown in operational block 808. Then, when surplus renewable energy (i.e., electricity) is no longer available, the Spontaneous Electrolyzer System (SES) 400 is no longer operating and is "off/idle" until the subsequent surplus renewable energy period, i.e., the next day between 10 am-2 pm. However, the compressed hydrogen gas that was stored within the storage device/facility 406 may be directed/delivered to devices that use hydrogen as fuel for generating heat or power.

Referring again to FIG. 7, one example showing the SES 400 being implemented using the method of the present invention is described immediately hereinafter. It should be appreciated that this example is intended to demonstrate some of the advantages of SES 400 compared to a conventional electrolyzer/compressor system. It is contemplated that this method of operation can be applied to many different types of embodiments and similar types of examples and applications.

It should be appreciated that when surplus renewable energy is available, it is typically available for only a short time. For example, surplus solar energy may only be available for harnessing during the daytime, say for four (4) hours (such as for example, between 10 am-2 pm). In current systems, modes of operation for long-duration hydrogen storage may use existing electrolyzers, such as, for example, a Polymer Electrolyte Membrane (PEM) electrolyzer coupled with a compressor. The PEM electrolyzer may be operated for the four (4) available hours daily when the surplus renewable energy is available. The generated hydrogen from the PEM electrolyzer is passed to a compressor, which in turn, increases the pressure of the hydrogen gas to the required pressure of the storage device/facility 406 (for example, a salt cavern which may be 100-200 bar). Then, when surplus renewable energy (i.e., electricity) is no longer available, the system is no longer operating and is "off/idle" until the subsequent surplus renewable energy period, i.e., the next day between 10 am-2 pm.

In this example, the PEM electrolyzer/compressor combination is typically "sized" to store a given amount of surplus solar electricity that is generated during this 4 hour duration period, and the average hydrogen flow rate passed to the storage facility during this 4 hour period is defined as $V_1$. As an example, a PEM electrolyzer sized for a delivery of 1 kg $H_2$/h may require an electrical input of approximately 50 kWh/kg $H_2$, and therefore, if PEM electrolyzer was operated for 4 hours a total of 200 kWh of surplus solar electrical energy may be harvested by passing a total of 4 kg $H_2$ to the compressor during that 4 hour period. This equates to an average flow rate of $V_1$=4 kg $H_2$/4 h=1 kg $H_2$/h. Therefore, according to the Nernst equation above, the required compression power to store 4 kg $H_2$ using a PEM electrolyzer is given as $kW_1$=a $V_1$ ln (P2/P1). It should be noted that, in this example, the PEM electrolyzer is idle the remaining twenty (20) hours of the day (since there is no surplus solar energy available to store), and therefore, the total amount of hydrogen stored is only 4 kg $H_2$ per day.

However, in accordance with one embodiment of the present invention the SES 400 may include an Electrolyzer Cell (or SECS) 402 that is 'sized' and configured to perform the same task as the PEM electrolyzer, i.e., store 200 kWh of surplus solar electricity during an available four (4) hour window to allow a total of 4 kg $H_2$ to be passed to a storage device/facility 406 per day. In this embodiment, the electrical energy is generated and stored according to a chemical reaction given by equation (1) hereinabove, when the zincate within the Electrolyzer Cell (or SECS) 402 is converted to zinc and the oxygen gas is vented to the atmosphere. It should be appreciated that in order to generate an equivalent of 4 kg $H_2$ (i.e., 2,000 moles $H_2$) during the discharge period, the Electrolyzer Cell 402 is sized to convert 2,000 moles of zinc-ion to zinc metal and simultaneously generate and vent 1,000 moles of $O_2$ during the charge period. These reactions are described in the stoichiometry of equations (1) and (2) hereinabove. It should be further appreciated that the charge is performed during the four (4) hour charge window period when the surplus solar electricity is available and when the surplus solar electricity is no longer available, the Electrolyzer Cell (or SECS) 402 may be turned off, i.e., idle.

At the end of the four (4) hour charge period window (i.e., 2 pm), the Electrolyzer Cell (or SECS) 402 may then be discharged at a rate that will allow the Electrolyzer Cell (or SECS) 402 to be fully discharged in time to be ready for re-charging at the beginning of the next four (4) hour surplus solar charge period window, i.e., 10 am the next day. The discharge current may be controlled such that the 2,000 moles of zinc metal that was formed during the four (4) hour surplus solar charge period window is converted back to zinc-ion during the period where the surplus solar electricity is not available (i.e., 2 pm on day 1 to 10 am on the day 2). It should be appreciated that during this conversion period, 2,000 moles (i.e., 4 kg $H_2$) of hydrogen are simultaneously and spontaneously generated via the conversion process, wherein the rate of this generated hydrogen sourced from the Electrolyzer Cell (or SECS) 402 is $V_2$=4 kg $H_2$/20 h=0.2 kg $H_2$/h. During this 20-hour discharge period, the hydrogen that is generated by the Electrolyzer Cell 402 is passed to the compressor 404 and compressed by the compressor 404 which is configured to compress the generated hydrogen to the pressure value (P2) of the storage device/facility 406, wherein the required compression power necessary to store 4 kg $H_2$, according to the equations hereinabove, is $kW_2$=a $V_2$ ln (P2/P1).

It should be appreciated that, as shown in the above example, the SES 400 of the present invention advantageously requires only 20% of the power required compared to current systems. Accordingly, the SES 400 of the present invention reduces the CapEx by 80% while accomplishing the desired objective. One reason for this is that the present invention advantageously has a hydrogen flow rate, $V_2$, that is one-fifth of the flow rate of $V_1$. This advantage is a direct result of the unique features of the SES 400 that allows for "de-coupling" the rate of input electrical energy and the hydrogen generation rate, as described hereinabove. This feature advantageously inherently lowers the levelized cost of hydrogen energy storage, which is directly related to the CapEx of the equipment when surplus electricity is available. It should be appreciated that although the above example is given with regards to surplus solar electricity, any type of energy source may be used to introduce electricity into the Electrolyzer Cell 100, 402 . . . such as wind power or off-peak nuclear power.

It should be appreciated that, in accordance with one or more embodiments of the invention, the Electrolyzer Cell 100, 402 and/or the method(s) of the invention as disclosed herein may be implemented as desired via any devices suitable to the desired end purpose, such as a processor, digital devices, analog devices and/or a combination of digital and analog devices. Thus, it is contemplated that, in accordance with one or more embodiments of the invention, the processing of the invention may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, the method of the present invention may be embodied in the form of a computer or controller implemented processes. The method of the invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it should be understood by those skilled in the art that various changes may be made, and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another. Additionally, it is contemplated that all voltages, currents and other values contained herein may fall within a range of ±10% to ±15% of its stated numerical value, as suitable to the desired end purpose. Moreover, it is further contemplated that the embodiments of the invention may use one or more Electrolyzer Cells 402 and/or compressors 404, separately and/or integrated together.

What is claimed is:

1. An Electrolyzer Cell (EC) configured to store electrical energy on charge and generate spontaneous hydrogen on discharge, the Electrolyzer Cell comprising:
   a cell casing having a casing bottom and defining a cell cavity,
   a plurality of positive electrodes disposed within the cell casing, wherein the plurality of positive electrodes is electrically connected together,
   a plurality of negative electrodes disposed within the cell casing, wherein the plurality of negative electrodes is electrically connected together,
   a cell base provided below the cell casing, the cell base comprising base side walls defining a base cavity and an electrolyte removal port at a bottom of the base cavity, and
   an aqueous electrolyte containing a reversible, electro-active material,
   wherein the aqueous electrolyte, the plurality of positive electrodes and the plurality of negative electrodes is located within the cell cavity, and
   wherein each of the plurality of positive electrodes is configured to be spaced apart from each of the plurality of negative electrodes.

2. The Electrolyzer Cell of claim 1, wherein the cell casing is configured to securely support the plurality of positive electrodes and the plurality of negative electrodes within the cell cavity, wherein the plurality of positive electrodes and the plurality of negative electrodes is configured such that the plurality of positive electrodes is electrically isolated from the plurality of negative electrodes.

3. The Electrolyzer Cell of claim 1,
   wherein one or more of the plurality of positive electrodes is constructed from a first electrode material that catalyzes electrochemical formation of at least one of hydrogen gas and oxygen gas from an electrolyte; and
   wherein one or more of the plurality of negative electrodes is constructed from a second electrode material is capable of reducing zincate to zinc metal and can oxidize zinc metal to zincate reversibly.

4. The Electrolyzer Cell of claim 3, wherein at least one of, the first electrode material being at least partially constructed of at least one of nickel and nickel foam; and
   the second electrode material being at least partially constructed of at least one of copper and copper foam.

5. The Electrolyzer Cell of claim 1, further comprising at least one positive terminal and at least one negative terminal,
   wherein the at least one positive terminal is connected to the plurality of positive electrodes, and
   wherein the at least one negative terminal is connected to the plurality of negative electrodes.

6. The Electrolyzer Cell of claim 1, wherein the cell casing further defines a replenishment port and a gas port,
   wherein the replenishment port is communicated with the cell cavity and configured to receive new aqueous electrolyte containing a reversible, electro-active material to allow the cell cavity to be replenished with new aqueous electrolyte containing a reversible, electro-active material;
wherein the electrolyte removal port is communicated with the cell cavity and configured to allow used aqueous electrolyte and dendritic material to be removed from the cell cavity; and
wherein the gas port is communicated with the cell cavity and is configured to vent gas out of the cell cavity.

7. The Electrolyzer Cell of claim 5, wherein the Electrolyzer Cell is configured to be connected to one or more similar Electrolyzer Cells in at least one of a parallel configuration and a series configuration via the at least one positive terminal and the at least one negative terminal.

8. The Electrolyzer Cell of claim 5,
wherein the reversible, electro-active material is zincate and wherein the reversible, electro-active material is configured to store electrical energy when electrical energy is introduced into the Electrolyzer Cell via the at least one positive terminal and the at least one negative terminal; and
wherein the reversible, electro-active material is configured to facilitate the generation of hydrogen gas when an electrical load is applied across the at least one positive terminal and the at least one negative terminal.

9. The Electrolyzer Cell of claim 1, wherein the aqueous electrolyte is at least one of aqueous potassium and sodium hydroxide.

10. A method for spontaneously generating hydrogen gas, the method comprising:
providing an Electrolyzer Cell comprising:
a cell casing having a casing bottom and defining a cell cavity;
at least one positive terminal connected to a plurality of positive electrodes disposed within the cell casing, wherein the plurality of positive electrodes is electrically connected together;
at least one negative terminal connected to a plurality of negative electrodes disposed within the cell casing, wherein the plurality of positive electrodes is electrically connected together;
a cell base provided below the cell casing, the cell base comprising base side walls defining a base cavity and an electrolyte removal port at a bottom of the base cavity; and
an aqueous electrolyte containing a reversible, electro-active material;
wherein the aqueous electrolyte, the plurality of positive electrodes and the plurality of negative electrodes is located within the cell cavity; and
wherein each of the plurality of positive electrodes is configured to be spaced apart from each of the plurality of negative electrodes;
introducing electricity into the electrolyzer cell until the reversible, electro-active material is converted into a charged, reduced chemical state;
operating the electrolyzer cell to convert the charged reversible, electro-active material from its charged, reduced chemical state into a discharged, oxidized chemical state and to generate hydrogen gas within the cell cavity; and
removing the generated hydrogen gas from the cell cavity.

11. The method of claim 10, wherein the reversible, electro-active material is zincate and wherein the aqueous electrolyte is saturated with the zincate.

12. The method of claim 10, wherein introducing electricity into the electrolyzer cell includes
introducing electricity to the reversible, electro-active material by applying a positive voltage difference across the at least one positive terminal and the at least one negative terminal until the reversible, electro-active material is converted into its charged, reduced chemical state; and
removing oxygen that is generated and released into the cell cavity.

13. The method of claim 12, wherein the positive voltage difference is greater than about 1.6 volts per cell.

14. The method of claim 10, wherein operating the Electrolyzer Cell includes converting the charged, reduced reversible, electro-active material into its discharged, oxidized chemical state by,
placing an electrical load across the at least one positive terminal and the at least one negative electrical terminal to facilitate an electric energy to flow through the electrical load, wherein the charged, reduced reversible, electro-active material delivers the electric energy through the electrical load to cause spontaneous, on-demand hydrogen to be released from the water and to build up within the cell cavity; and
removing the generated hydrogen gas from the cell cavity.

15. The method of claim 14, wherein an electric current flows through the electrical load and has a resultant voltage of less than 0.4 volts.

16. The method of claim 14, wherein the method further includes:
generating the hydrogen gas at a generation rate, and
controllably removing the generated hydrogen gas from the cell cavity via a gas port by adjusting the electric current flowing through the electrical load and delivering the generated hydrogen gas to at least one of,
a hydrogen compressor,
a hydrogen gas storage vessel, and
a device/system which uses hydrogen gas as at least one of fuel and chemical feedstock.

17. The method of claim 10, further comprising performing a post-discharge procedure following discharge of the reversible, electro-active material, wherein the post-discharge procedure includes,
introducing a negative voltage difference across the at least one positive terminal and the at least one negative terminal for a predetermined period of time.

18. The method of claim 17, wherein the negative voltage difference ranges between about −1.5 volts and about 0 volts per cell.

19. The method of claim 17, wherein the post-discharge procedure is performed following discharge of the reversible, electro-active material to remove undischarged pockets of metallic zinc from the surfaces of the plurality of negative electrodes.

20. The method of claim 10, wherein converting the charged, reduced reversible, electro-active material into its discharged, oxidized chemical state includes applying at least one of,
an electrical load to the charged, reduced reversible, electro-active material, and an
electrical short to the charged, reduced reversible, electro-active material.

21. An Electrolyzer Cell System (ECS) having a plurality of Electrolyzer Cells (EC), wherein each of the plurality of Electrolyzer Cells is configured to store electrical energy on charge and generate spontaneous hydrogen on discharge, each of the Electrolyzer Cells comprising:
a cell casing having a casing bottom and defining a cell cavity, a plurality of positive electrodes disposed within the cell casing, wherein the plurality of positive electrodes is electrically connected together, a plurality of negative electrodes disposed within the cell casing, wherein the plurality of negative electrodes is electrically connected together, a cell base provided below the cell casing, the cell base comprising base side walls defining a base cavity and an electrolyte removal port at a bottom of the base cavity, and an aqueous electrolyte containing a reversible, electro-active material, wherein the aqueous electrolyte, the plurality of positive electrodes and the plurality of negative electrodes is located within the cell cavity, and wherein each of the plurality of positive electrodes is configured to be spaced apart from each of the plurality of negative electrodes.

22. The Electrolyzer Cell System of claim 21, wherein one or more of the plurality of positive electrodes is constructed from a first electrode material that catalyzes electrochemical formation of at least one of hydrogen gas and oxygen gas from an electrolyte; and wherein one or more of the plurality of negative electrodes is constructed from a second electrode material is capable of reducing zincate to zinc metal and can oxidize zinc metal to zincate reversibly.

23. The Electrolyzer Cell System of claim 21, wherein at least one of, the plurality of positive electrodes is connected to at least one positive terminal and is at least partially constructed of at least one of nickel and nickel foam; and the plurality of negative electrodes is connected to at least one negative terminal and is at least partially constructed of at least one of copper and copper foam.

24. The Electrolyzer Cell System of claim 21, wherein each of the plurality of Electrolyzer Cells includes a cell casing which defines a cell cavity, a replenishment port and a gas port, wherein the replenishment port is communicated with the cell cavity and configured to receive new aqueous electrolyte to allow the cell cavity to be replenished with new aqueous electrolyte;

wherein the electrolyte removal port is communicated with the cell cavity and configured to allow used aqueous electrolyte and dendritic material to be removed from the cell cavity; and wherein the gas port is communicated with the cell cavity and is configured to vent gas out of the cell cavity.

25. The Electrolyzer Cell System of claim 23, wherein each of the plurality of Electrolyzer Cells is configured to be connected to the others of the plurality of Electrolyzer Cells in at least one of a parallel configuration and a series configuration via the at least one positive terminal and the at least one negative terminal.

26. A method for generating, compressing and storing hydrogen gas, the method comprising:

providing an Electrolyzer Cell System (ECS) comprising a plurality of Electrolyzer Cells, wherein each of the plurality of Electrolyzer Cells is configured to store electrical energy on charge and generate spontaneous hydrogen on discharge, each of the Electrolyzer Cells comprising:

a cell casing having a casing bottom and defining a cell cavity, a plurality of positive electrodes disposed within the cell casing, wherein the plurality of positive electrodes is electrically connected together, a plurality of negative electrodes disposed within the cell casing, wherein the plurality of negative electrodes is electrically connected together, a cell base provided below the cell casing, the cell base comprising base side walls defining a base cavity and an electrolyte removal port at a bottom of the base cavity, and an aqueous electrolyte containing a reversible, electro-active material, wherein the aqueous electrolyte, the plurality of positive electrodes and the plurality of negative electrodes is located within the cell cavity, and wherein each of the plurality of positive electrodes is configured to be spaced apart from each of the plurality of negative electrodes introducing electricity into at least one Electrolyzer Cell to cause the reversible, electro-active material to be converted into a charged, reduced chemical state;

converting the charged, reduced reversible, electro-active material into a discharged, oxidized chemical state by applying at least one electrical load to the at least one Electrolyzer Cell to cause an electrical current to flow through the electrical load and to spontaneously generate hydrogen gas within the at least one Electrolyzer Cell;

controllably venting the hydrogen gas from the cell cavity and introducing the hydrogen gas to a compressor to generate compressed hydrogen gas;

temporarily storing the compressed hydrogen gas within the compressor;

and transferring the compressed hydrogen gas to a storage device/facility for storage and later usage.

27. The method of claim 26, wherein the Electrolyzer Cell includes at least one positive terminal and at least one negative terminal and wherein converting includes locating the electrical load across the at least one positive terminal and at least one negative terminal to cause the electrical current to flow through the electrical load.

28. The method of claim 26, wherein the reversible, electro-active material is zincate.

29. The method of claim 26, further comprising, charging the Electrolyzer Cell System by introducing electrical energy into the Electrolyzer Cell System at a first predetermined charge rate, discharging the Electrolyzer Cell System to generate hydrogen gas, wherein the Electrolyzer Cell System is discharged by applying an electrical load to the ECS to discharge the Electrolyzer Cell System to generate hydrogen gas at a second predetermined discharge rate, transferring the hydrogen gas to a compressor, wherein the compressor is configured to operate responsive to the second predetermined discharge rate.

30. The method of claim 29, wherein the second predetermined discharge rate is lower than the first predetermined charge rate.

31. The Electrolyzer Cell of claim 5, further comprising:

a power supply operably coupled to the at least one positive terminal and the at least one negative terminal; and a processor operably connected to the power supply and configured to control the power supply to, following discharge of the reversible, electro-active material, supply a negative voltage difference across the at least one positive terminal and the at least one negative terminal for a predetermined period of time.

32. The Electrolyzer Cell of claim 31, wherein the negative voltage difference is in a range of about −1.5 volts to about 0 volts per cell.

33. The Electrolyzer Cell System of claim 25, further comprising:
- a power supply operably coupled to the at least one positive terminal and the at least one negative terminal; and
- a processor operably connected to the power supply and configured to control the power supply to, following discharge of the reversible, electro-active material, supply a negative voltage difference across the at least one positive terminal and the at least one negative terminal for a predetermined period of time.

34. The Electrolyzer Cell System of claim 33, wherein the negative voltage difference is in a range of about −1.5 volts to about 0 volts per cell.

35. The method of claim 10, further comprising removing the aqueous electrolyte or dendritic material from the Electrolyzer Cell via the electrolyte removal port.

36. The method of claim 26, further comprising removing the aqueous electrolyte or dendritic material from each Electrolyzer Cell of the plurality of Electrolyzer Cells via the corresponding electrolyte removal port.

\* \* \* \* \*